US010296269B1

(12) United States Patent
Bermundo et al.

(10) Patent No.: US 10,296,269 B1
(45) Date of Patent: May 21, 2019

(54) PORTABLE MULTI-FUNCTION PRINTING EXTENSION COMPUTING DEVICE

(71) Applicant: KYOCERA DOCUMENT SOLUTIONS, INC., Osaka (JP)

(72) Inventors: Neil-Paul Bermundo, Glendora, CA (US); Wen-Jiun Randy Lin, Covina, CA (US)

(73) Assignee: KYOCERA DOCUMENT SOLUTIONS, INC., Osaka (JP)

(*) Notice: Subject to any disclaimer, the term of this patent is extended or adjusted under 35 U.S.C. 154(b) by 0 days.

(21) Appl. No.: 15/847,499

(22) Filed: Dec. 19, 2017

(51) Int. Cl.
*G06F 3/12* (2006.01)
*H04N 1/00* (2006.01)

(52) U.S. Cl.
CPC .......... *G06F 3/1209* (2013.01); *G06F 3/1248* (2013.01); *G06F 3/1288* (2013.01); *H04N 1/00344* (2013.01); *H04N 2201/0094* (2013.01)

(58) Field of Classification Search
CPC .... G06F 3/1209; G06F 3/1248; G06F 3/1288; H04N 1/00344; H04N 2201/0094
See application file for complete search history.

(56) References Cited

U.S. PATENT DOCUMENTS

| | | | |
|---|---|---|---|
| 6,369,909 B1 | 4/2002 | Shima | |
| 7,382,484 B2 | 6/2008 | Matsukubo et al. | |
| 7,706,017 B2 | 4/2010 | Ferlitsch | |
| 7,898,682 B2 | 3/2011 | Matsuo | |
| 7,948,643 B2 | 5/2011 | Aritomi | |
| 8,286,097 B2 | 10/2012 | Tanji | |
| 2005/0190395 A1* | 9/2005 | Aritomi | G06F 3/1203 358/1.13 |
| 2005/0206917 A1* | 9/2005 | Ferlitsch | G06K 15/02 358/1.5 |
| 2008/0292138 A1* | 11/2008 | Watari | H04N 1/00183 382/100 |
| 2013/0201316 A1* | 8/2013 | Binder | H04L 67/12 348/77 |
| 2016/0112718 A1* | 4/2016 | Sakata | H04N 19/172 382/233 |
| 2018/0143795 A1* | 5/2018 | Masuzawa | G06F 3/1207 |
| 2018/0268267 A1* | 9/2018 | Harayama | G06K 15/021 |

* cited by examiner

*Primary Examiner* — Iriana Cruz
(74) *Attorney, Agent, or Firm* — Millen, White, Zelano & Branigan, P.C.; William Nixon

(57) ABSTRACT

An extension computing device connects to a multi-function printing (MFP) device to enable additional functionality and capabilities to support the MFP device. Print jobs and other tasks may be performed in the extension computing device so that the MFP device addresses more important tasks in real time. The extension computing device receives and processes a print job without the need to engage the MFP device or its engine. The print job then may be stored in the extension computing device until it is printed on demand by the MFP device. Other applications also may be located in the extension computing device. An extension engine performs tasks to determine when to process the print job in the extension computing device. The extension computing device includes a processor, a print job manager, a storage, an operating system, and input/output capabilities.

19 Claims, 9 Drawing Sheets

PORTABLE MULTI-FUNCTION PRINTING EXTENSION COMPUTING DEVICE

FIELD OF THE INVENTION

The present invention relates to a portable device to extend the computing functionalities and capabilities for a multi-functional printing device.

DESCRIPTION OF THE RELATED ART

Printers and associated equipment may have slower upgrade cycles and retain legacy printer engines. The initial high costs of printer engines result in older printer engines being kept longer in offices even if not used. There is less demand for newer printer engines or other features. Further, several months may pass between product releases due to development issues in hardware or software. Moreover, the cost of fixing firmware issues or doing firmware upgrades may be costly. Not only in terms of hardware replacements or software updates, but also with technicians visiting the customers to perform these actions.

SUMMARY OF THE INVENTION

An extension computing device for processing documents at a multi-function printing (MFP) device is disclosed. The extension computing device is connected to the MFP, which is, in turn, connected to a network. The extension computing device includes a print job manager to schedule a print job received over the network. The extension computing device also includes an extension engine to determine whether the print job is an extension command or a page description language (PDL) print job. The extension computing device also includes raster image processing (RIP) firmware to process the PDL print job from the print job manager to generate a document image. The extension computing device also includes communication layer to interface with the external device and the MFP device. The extension computing device also includes a storage to store the document image. The extension engine performs a function within the extension computing device in response to the extension command.

A method for processing a print job at an extension computing device coupled to a multi-function printing (MFP) device is disclosed. The method includes receiving a print job from the MFP device, wherein the print job includes an extension command. The method also includes processing the print job at the extension computing device using a print job manager and a raster image processing (RIP) firmware to generate a rasterized document image. The method also includes storing the rasterized document image within a storage accessible by an extension engine of the extension computing device.

A method for using an extension computing device with a multi-functional printing (MFP) device is disclosed. The method includes analyzing a header of a print job. The method also includes determining whether the print job includes an extension command for document storage according to the header. The method also includes transferring the print job to the extension computing device. The method also includes processing the print job at the extension computing device to generate a rasterized document image. The method also includes storing the rasterized document image within a storage associated with the extension computing device. The method also includes retrieving the rasterized document image from the storage when instructed. The method also includes sending the rasterized document image to the MFP device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
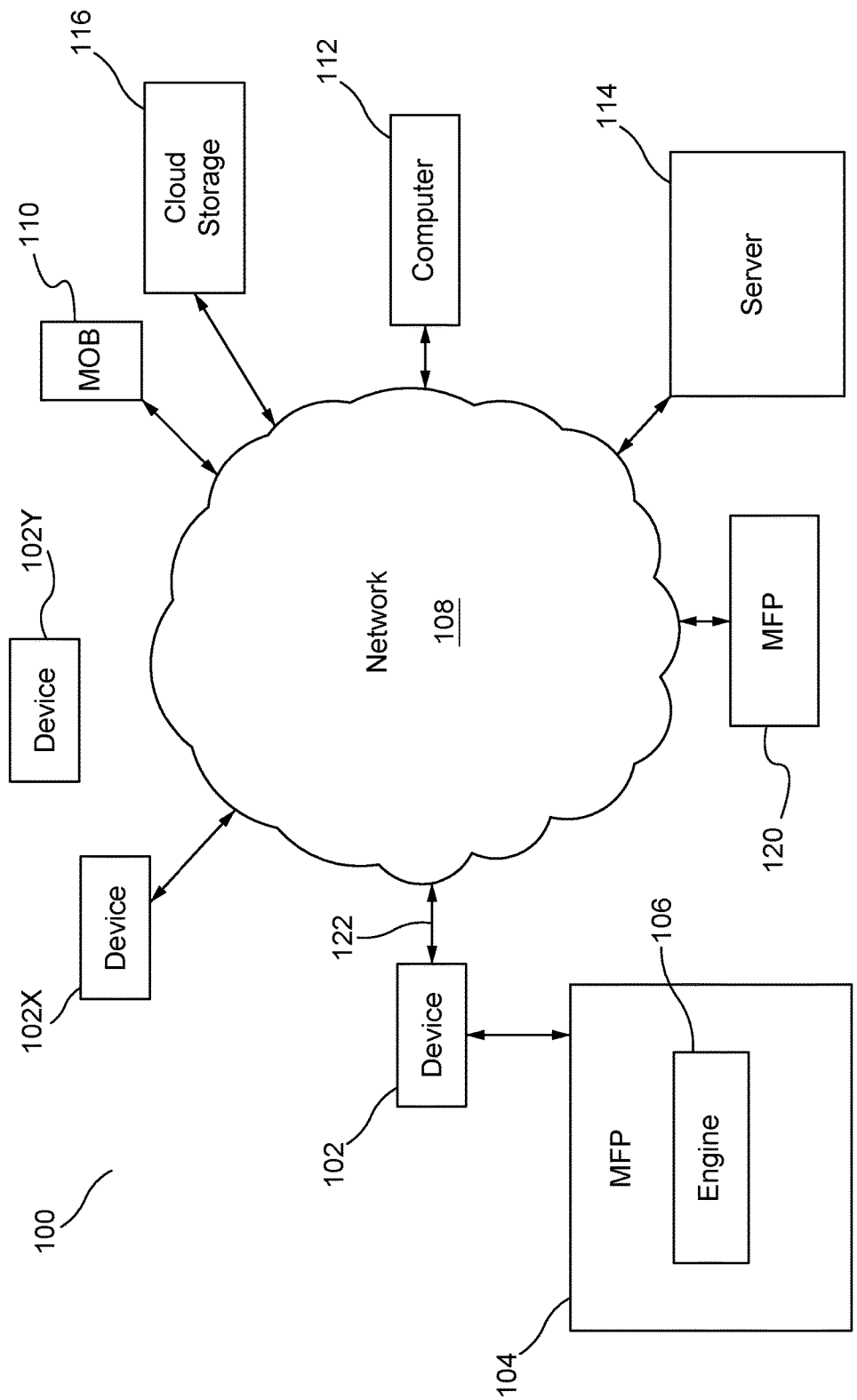
FIG. 1 illustrates a block diagram of a system for performing printing operations using a portable extension computing device according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

When designing the controller and other firmware components for an imaging device, such as a multi-function printing (MFP) device, several design factors are considered to ensure that the MFP will function as desired to serve its purpose for users and customers. Some hardware design factors may be memory size, integrated chip capacity for all of the firmware, processor power, and storage capacity. In some embodiments, there is a limitation on how much firmware can be hosted in the integrated chip within the MFP. For example, one may not be able to install upgraded or new applications due to a lack of storage capacity within the MFP.

The disclosed embodiments, therefore, provide a virtually unlimited capacity to hold various applications without the need to un-install or re-install the applications. This feature will improve the value of the imaging device. If the development of firmware is not limited to the capacity of the hardware components in the MFP such as disk storage, read-only memory, and integrated chip capacity, which allows more features to be developed, installed, and packaged. Developers innovate with increased flexibility and add features to legacy devices.

Non-hardware design factors include performance or efficiency of processing any kind of jobs, such as print, scan, fax, copy, and the like. Print jobs should be processed quickly to reduce the waiting time for the printed materials. At times, one has to wait for a printout because the printer is busy doing another job, especially in busy offices. If there is any way to improve the processing performance during execution of the print jobs, then it will add value to the MFP.

The disclosed embodiments may offload some of the features from the hardware and firmware components in the MFP. The offloaded features may include CPU-consuming processes that are not critical to printing workflow. Examples of such activities and processes include document storage, user account management, job accounting, web servicers, diagnostic tools, MFP firmware upgrade service, remote access, and the like.

If the processes are offloaded and performed outside of the MFP, then the device may have the main engine processor and firmware available for critical printing and imaging processes. Non-critical processes could be performed in the background or in another computing space. This feature differs from a pure multi-tasking or multi-threading system because such systems still share the processor, storage, and memory to execute operations. When the main hardware resources are shared, limitations still exist on how many functions and how much processing can be done by MFP.

Thus, the disclosed embodiments provide a separate but accessible system that may offload non-critical processes and reduce the load on the main critical resources of the MFP. The MFP extension computing device provides capabilities through the development of a computing device that is separate and external from the main computing components of the MFP. The extension computing device is a portable computing device that includes a processor, memory, storage, and firmware components. The applications, such as document storage, user account management, web services, diagnostic tools, and the like will be hosted in the extension computing device and data will become available as-needed for the MFP or main imaging device.

An extension computing device provides the benefits of portability, a shareable device between MFPs, shared data, and easy upgrade and maintenance capabilities. It also may provide direct connectivity via the off-the-shelf industry standard connector/adapter and industry standard protocol for the different type of the data communication between the extension computing device (ECD) and MFP. These benefits are disclosed in greater detail below.

Portability refers to the same extension computing device being able to connect to various imaging devices. As a shared computing device, it is entirely possible for the services, applications, and features that are installed, hosted, and executed from the extension computing device to be shared and functional when connected to the various imaging devices. The extension computing device will detect the model of the imaging device, or MFP, to enable and provide the features and capabilities that work for the connected imaging device. The extension computing device can be connected to a MFP device via the direct connection like the USB connection, the HDMI connection, USB-UART (The Universal Asynchronous Receiver/Transmitter) connection or direct UART port (RX, TX, and the like) connection, USB-OTG, and the like, in order to connect the ECD and the MFP device depending on the type of the communications between the ECD and MFP device. For example, the HDMI connection can be used to transfer the bulk raster data like the DVI interface. The USB-UART or UART port connection will help support the command/status communication. The USB-OTG will let ECD work as a host/device on the fly, and the like. The ECD can be used to serve a mass storage of MFP device in the device mode in the USB-OTG connection.

The extension computing device also is a shareable device that allows and serves the services, applications, and features to remote imaging devices that may require, need, or request such functions through a wireless connection like wifi, NFC, Bluetooth™, and the like. In other words, many MFPs and their engines may use a common extension computing device in a network, thereby simplifying use of the various features provided by the device. As a shareable device, another benefit is that if some features, services, or applications contain and manage user data, document data, or device data, then the data will be available to any imaging device that connects to the extension computing device. The data may become available to anyone and from anywhere.

Another benefit of the extension computing device is easy upgrades and maintenance. Because the extension computing device is shared, the number of devices in an office or location would be reduced compared to the number of imaging devices. Thus, maintenance and upgrading would not be costly or difficult.

The disclosed embodiments include a portable printing computing device having a page description language (PDL) or raster image processor (RIP) system. The extension computing device may be an external computing device with a computer processing unit, a memory, and an operating system. The extension computing device also includes connectivity interfaces to connect to existing printer devices. It also implements networking capability to advertise itself as another printer device on a network.

The disclosed extension computing device supports connectivity interfaces with the printer device and new PDL technologies. It also receives firmware upgrades from servers for performing engine firmware upgrades or maintenance. When connected, the extension computing device detects native PDLs supported in the printer device and provides a pass-through for those PDLs. The extension computing device may translate unsupported PDL to native PDL, or basic raster formats, like JPEG/TIFF supported by the printer engine. This feature allows compatibility with any printer, even those from other manufacturers.

The extension computing device also overrides engine firmware components if the PDL RIP firmware in the device is more "up-to-date" and includes new features missing on the printer engine. It also helps test a firmware upgrade before it is installed as a final firmware upgrade to the engine. Dumb printers may be developed with the RIP override feature such that RIP functionality exists and operates externally of the printer. The extension computing device also may host imaging applications that receive images or data from mobile applications, web applications, or desktop devices to print to the printer engine. The extension computing device may register to enterprise printer management tools for device manageability.

The existing printer driver and its associated print queue will still be available for use as normal. In other words, if a user selects the print queue associated with the printer device, then the user will have the same printer features and capabilities as provided by the legacy printer engine and printer driver for the print queue. A print queue for the extension computing device will appear as a new print queue to allow the new functionalities and capabilities to be added onto the legacy or third-party printer devices.

In another embodiment, the print queue or printer driver, which normally has a printer port configured to point to an MFP or printer, may be configured to have a printer port that points, instead, to a MFP extension computing device. A printer port, such as the one in an operating system, which is managed by a port monitor, and serves as a connection between the printer driver or print queue to a printer, can also be the means of connection between printer driver or print queue and MFP extension computing device. In this configuration, the printer driver, through the port configured as the IP address of the MFP extension computing device, would send the print driver generated print job to the networked MFP extension computing device. In this configuration, the user will be able to take advantage of the printer driver features and at the same time, apply and take advantage of the MFP extension device features. This further implies that any printer driver can be pointed and associated with the networked MFP extension computing device.

If the user selects the extension computing device print queue as the destination for a print job, then the new features that are not necessarily present or unsupported in the printer engine but supported by the extension computing device will become available to the user. The user can access the new printer features that the portable printing computing device can perform and print using the printer engine.

DEFINITIONS

MFP—Multi-Function (or Functional) Printer or Printing Device.

PDL—Page Description Language, a type of programming language that describes the document or pages in a print job. Examples of PDLs are Printer Command Language (PCL) 5, PCLXL, or PCL 6, and PostScript. Portable Document Format (PDF) and XML Paper Specification (XPS) also belong to this group. Image formats, such as JPG and TIFF, which also can be printed, are special cases that are handled by the PDL.

RIP—Raster Image Processor, a firmware component that includes PDL interpreters. This feature is disclosed in greater detail below.

Print File, Print Job, or Test File—A computer file that contains PDL commands and is raw printable data for the MFP. A print job is the output of the printer driver. It is a binary representation in one of the PDL formats, such as PCL, PDF, or XPS.

Graphics Rendering Component—An internal component in the RIP firmware that translates the PDL commands or data into binary data that that MFP engine can understand. This is similar to machine language to which programming languages are translated so that computing devices can understand. The binary data is such that the Graphics Rendering Level will be understood by the hardware and converted to actual drawing or pixels on the paper. This component is disclosed in greater detail below.

GEU—Graphics Execution Unit, a hardware component at the engine that executes the Orderlist generated from the Graphics Rendering Component to create a raster representation of the print job or document.

Printer Driver—A device driver in Windows™ or other operating systems that translates a document into a print job.

Graphics Orderlist—A binary data representation to which PDL commands are translated by the Graphic Rendering Component. Graphics Orderlists are low-level graphics instructions that the MFP hardware understands and processes to translate to actual markings on a page. Like machine language for a computer, the Graphics Orderlist is a language that the MFP will understand.

Band Data—A row of binary data of results from the processing of the Graphics Orderlist. It appears like a pixmap or bitmap image representation of the page. A page consists of rows of band data. The size of each one may be the same, such as 128 bytes. In some embodiments, the height of each band may be dynamic. The width may be the width of the page to be rendered.

Dumb Printer—An idea of a printer engine that does not have RIP firmware. Raster image processing is performed external of the printer. The printer receives fully rendered pages in either graphics orderlist form or raster form (band data) that the printer engine can process for actual markings on the paper.

FIG. 1 depicts a block diagram of a system 100 for performing printing operations using an extension computing device 102 according to the disclosed embodiments. System 100 may be an example of network architecture to illustrate how extension computing device 102 is used in conjunction with MFP 104. As shown, extension computing device 102 is a separate component that may attach to MFP 104. Extension computing device 102 may be a USB device to engage a USB port on MFP 104.

Extension computing device 102 also connects to network 108 to communicate with other components within system 100, such as mobile device 110, computer 112, or server 114. As can be appreciated, system 100 may include many additional components that send tasks to MFP 104. Mobile device 110 may be a handheld or portable computing device, such as a smartphone, that sends files for processing by MFP 104. For example, mobile device 110 may send pictures to be printed on MFP 104. Computer 112 may be a desktop or laptop computer connected to network 108 to also utilize MFP 104. Server 114 may be a data storage device that provides upgrades to MFP 104. These upgrades may be software upgrades or patches for software or firmware components on MFP 104. Server 114 also may communicate with extension computing device 102. Extension computing device 102 and MFP 104 may send information to server 114 for storage. Mobile device 110, computer 112, and server 114 may run applications internally to perform printing and scanning operations. Cloud storage 116 may be internet or cloud based storage location.

Extension computing device 102 may connect to engine 106 of MFP 104. The connection may occur via the combination of an HDM port or a USB/UART port. The HDMI port may be for a bulk raster data transfer and the USB/UART may be for command/status communication. It provides all of the new technologies such as new PDLs and mobile applications to be available for engine 106 and the users of MFP 104. As noted above, extension computing device 102 may be a separate computing device that is attached to MFP 104. As a computing device with networking connectivity, extension computing device 102 also may be organized as a cluster fleet of cooperating devices to make available new technologies throughout network 108, including support for older and third-party engines. Extension computing device 102 may receive print job parts from other portable printing computing devices, such as printing devices 102X and 102Y, or printers, such as MFP 120, for remote processing. This feature assists busy printer engines or busy portable printing devices.

Extension computing device 102 may support various connectivity features as an external but portable software, firmware, or device. The connectivity features include, but are not limited to, wifi, local area networks, NFC, parallel port, serial port, USB printer port, USB data port, Bluetooth, internet and the like. Further connectivity features to a printer, computer, both wireless and wired, can be added, integrated, and supported. The connectivity features include, but are not limited to, wifi, local area networks, NFC, parallel port, serial port, USB printer port, USB data port, Bluetooth, HDMI port, DVI port, USB/UART port, UART port, internet and the like.

Input data for extension computing device 102 may be received from a connection 122, which may be wireless. For example, if extension computing device 102 is a USB computing device, then the data would come through wireless or wired connection 122 connected to network 108. If extension computing device 102 is a mobile computer, then data may come through input ports connected through a wireless or wired connection 122. Extension computing device 102 also generates output data through its various connectivity ports. The connectivity ports may be a USB data port, a USB printer port, wifi, NFC, Bluetooth, TCP/IP, and the like. Extension computing device 102 may connect to any input ports in MFP 104 and also may include wired, wireless, or direct connections. The connectivity features include, but are not limited to, wifi, local area networks, NFC, parallel port, serial port, USB printer port, USB data port, Bluetooth, HDMI port, DVI port, USB/UART port, UART port, internet and the like.

Extension computing device 102 may be a USB computing device, an HDMI computing device, a Blackberry Pi device, a personal computer, a mobile or smartphone device, a tablet, a mini personal computer, and the like. In some embodiments, it may be possible to integrate extension computing device 102 inside MFP 104 because the printing device includes functions that can be implemented entirely in software or firmware. Extension computing device 102 may be MFP firmware component or an application residing and hosted in a flash memory area. The behavior of a locally hosted application or firmware component may function like extension computing device 102, disclosed below, as long as it is upgradeable and provides the features disclosed below. The capabilities that the disclosed embodiments are aiming to provide can all be performed in any computing device that can be connected either by wire or wirelessly to any imaging device like MFP 104 or a printer engine.

Figure 2:
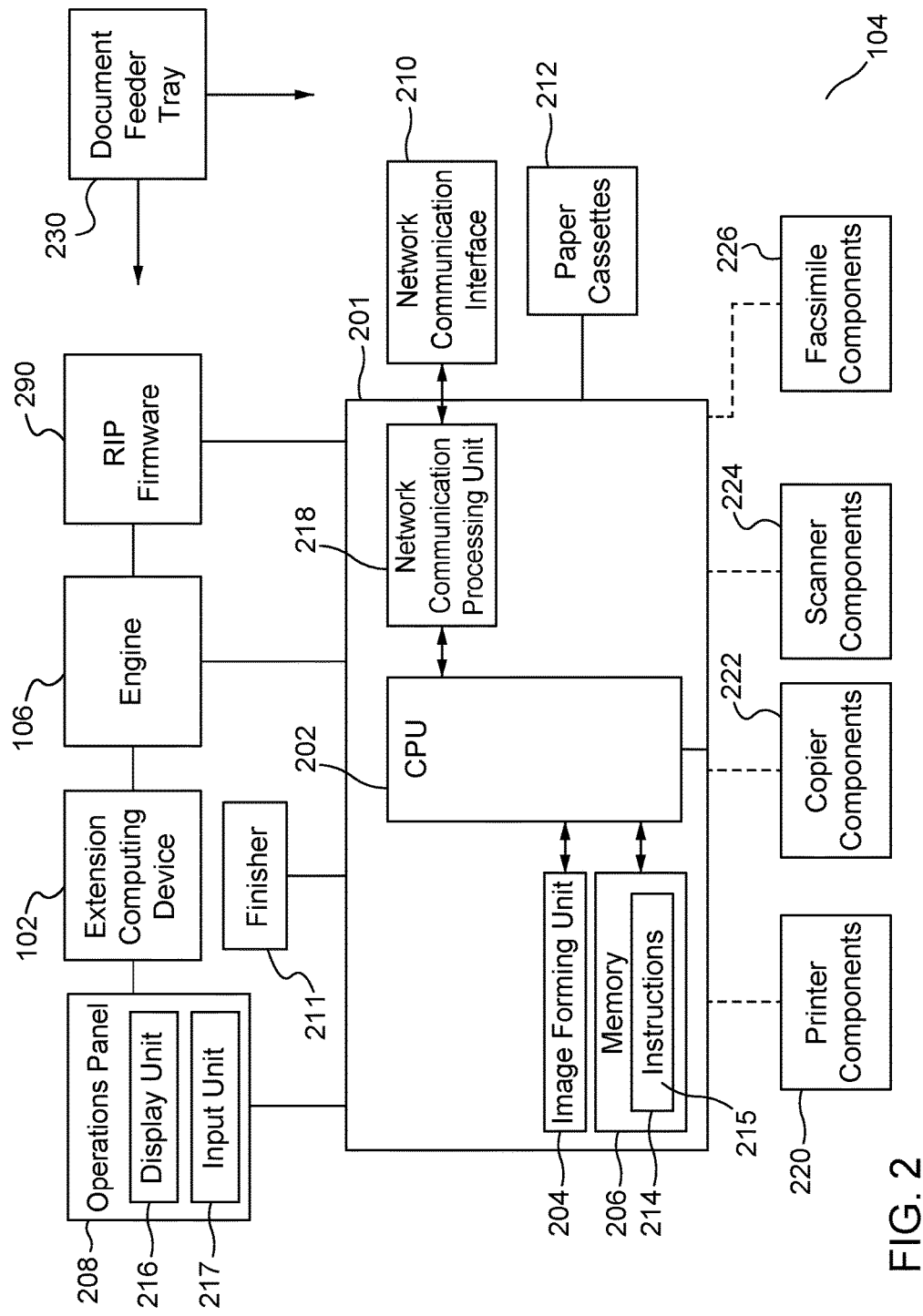
FIG. 2 illustrates a block diagram of components of the MFP used in conjunction with the portable extension computing device according to the disclosed embodiments.

An example of MFP 104 architecture along with extension computing device 102 may be shown in FIG. 2. The architecture shown in FIG. 2 may apply to any multi-functional printer or image forming apparatus that scans documents to perform other functions, such as printing, storing, copying, and the like. Extension computing device 102, as shown, is connected to engine 106, which, in turn, is connected to the other components of MFP 104.

MFP 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. MFP 104, using computing platform 201, may be configured to perform various operations, such as scanning, copying, printing, receiving or sending a facsimile, or document processing. As such, MFP 104 may be a printing device or a multi-function peripheral including a scanner, and one or more functions of a copier, a facsimile device, and a printer. To provide these functions, MFP 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

MFP 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of MFP 104 to receive papers and documents to be processed. A document is placed on or in document processor input feeder tray 230, which moves the document to other components within MFP 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with MFP 104, such as any processors within components 220, 222, 224, or 226. Memory unit 206 also may store information for various programs and applications, as well as data specific to MFP 104. For example, a storage location 214 may include data for running an operating system executed by computing platform 201 to support the components within MFP 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause MFP 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause MFP 104 to act as a printer, copier, scanner, and a facsimile device.

MFP 104 also includes an operations panel 208, which may be connected to computing platform 201. Operations panel 208 may include a display unit 216 and an input unit 217 for facilitating interaction with a user to provide commands to MFP 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Extension computing device 102 may be connected via operations panel 208 to engine 106.

MFP 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on MFP 104. CPU 202 also may retrieve information stored in memory unit 206, such as settings for MFP 104.

MFP 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from extension computing device 102.

Engine 106 manages and operates the low-level mechanism of the MFP engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on MFP 104. RIP firmware 290 may be disclosed in greater detail below.

Figure 3:
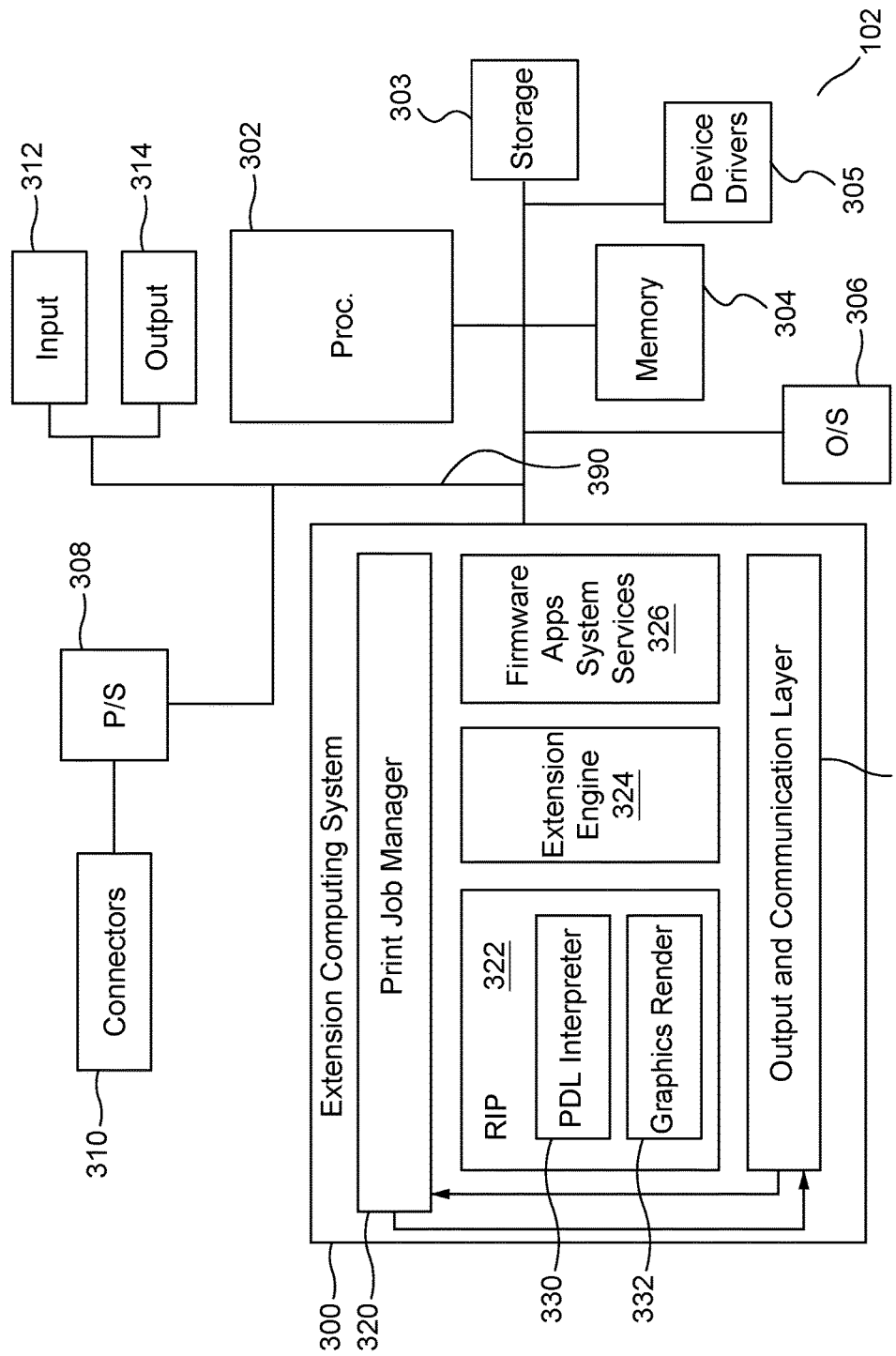
FIG. 3 illustrates a block diagram of the components for an extension computing device according to the disclosed embodiments.

FIG. 3 depicts a block diagram of the components for extension computing device 102 according to the disclosed embodiments. Additional components may be implemented within extension computing device 102 beyond what is disclosed below. Extension computing device 102 includes extension computing system 300 that provides the functionality to enable the extension computing device to manage operations internally and interact with MFP 104 and engine 106. In some embodiments, extension computing system 300 may be referred to as an extension system. Extension computing system 300 is disclosed in greater detail below.

Extension computing device 102 also includes components that enable the device to stand alone as a computing device, such as processor 302, storage 303, memory 304, and device drivers 305. Processor 302 executes instructions and commands. It also instructs the other components within extension computing device 102 to perform actions. Memory 304 may store the instructions executed by processor 302. In some embodiments, memory 304 is a random access memory that caches instructions to be executed in real-time. Storage 303 may be a hard drive that provides additional memory capability to extension computing device 102. Storage 303 stores data and information for use by components within printing device 102. Storage 303 also may store print jobs, files, and the like from MFP 104. Device drivers 305 may control extension computing device 102 when it is attached to MFP 104. Processor 302, storage 303, memory 304, and device drivers 305 may be connected by bus 390.

Bus 390 also connects other components in extension computing device 102 to processor 302, storage 303, and memory 304. Operating system 306 also is provided. Preferably, operating system 306 is a mobile operating system that provides the software platform for other programs to run on extension computing device 102. Operating system 306 is responsible for determining the functions and features available on extension computing device 102. For example, operating system 306 allows extension computing system 300 to run within extension computing device 102. Operating system 306 also may work with device drivers 305 to convert the general input/output instructions of the operating system to messages that components within extension computing device 102 can understand.

Extension computing device 102 may include a power supply 308. In some embodiments, power supply 308 may be stand alone, such that extension computing device 102 does not need to draw power from another source. Preferably, power supply 308 obtains power from a connected device, such as MFP 104. Power supply 308 may use one or more connectors 310 to draw power. For example, if extension computing device 102 is connected to a USB hub or port, then connectors 310 may be two wires within the USB interface to connect to power within MFP 104.

Extension computing device 102 also may receive and send data over network 108 as well as to the connected MFP 104. Input 312 and output 314 represent the capability to exchange data, such as over wireless connection 122. Input 312 and output 314 also may include having wires through the USB cable to MFP 104 from extension computing device 102, if applicable. Input 312 may include multiple input ports while output 314 may include multiple output ports. Input 312 and output 314 may receive commands and data from extension computing system 300 as well as provide data when received from network 108.

Extension computing system 300 may include components that allow it to support connectivity with network 108 and provide the functions disclosed in greater detail to manage MFP 104 and engine 106. These components are shown in FIG. 3.

Print job manager 320 includes a firmware component that receives print jobs from network 108 or any of the supported connectivity methods. Print job manager 320 also may receive print jobs from connected MFP 104, from network 108, from other devices, or from any of the supported connectivity methods, such as Network, Wi-Fi, USB, Bluetooth™, NFC, and the like. It arranges the incoming data into unique print jobs. Print job manager 320 may identify each print job with a job identification (ID), a timestamp, user/owner IDs, and similar data for the purposes of job scheduling, document tracking, and job management purposes. After completing these tasks, print job manager 320 schedules the sending of the print jobs to MFP 104 and relays them down to RIP firmware 322.

After RIP firmware 322 stores or manages the processed jobs in extension computing device 102, the extension computing device may receive requests for the previously processed jobs for downloading to MFP 104. Extension computing device 102 will request to print job manager 320 to retrieve the processed job or other data such as job accounting information, account login, and authentication information. As can be seen in the role of print job manager 320, it may receive print jobs from network 108 or from MFP 104.

Print job manager 320 also allows extension computing device 102 to receive print jobs and other kinds of jobs or requests directly from applications on connected devices, from network 108, or through other means. This feature allows those jobs to bypass MFP 104, thereby making the imaging device available to more critical or urgent printing tasks. The types of print jobs that can be sent directly to extension computing device 102 are those that do not need to be printed immediately, but rather stored for later printing at the extension computing device. For example, a document storage job may be handled within extension computing device 102 with the help of print job manager 320.

When connected MFP 104 receives print jobs, it is possible to relay those jobs to extension computing device 102 for processing therein. This feature may require an MFP firmware upgrade so that the MFP firmware knows which types of print jobs, scanned jobs, or other requests like job accounting or user account management may be offloaded and performed or processed at extension computing device 102. These embodiments are disclosed in greater detail below.

RIP firmware 322 may be a full raster image processor that provides functionality to extension computing system 300. RIP firmware 322 provides all the capabilities of a RIP firmware in a printer engine except for the actual rendering on paper. The rendering may be done by engine 106 of MFP 104. RIP firmware 322 includes the following sub-components of PDL interpreter 330 and graphics rendering component 332. These are disclosed in greater detail below.

With the capability to receive print jobs or other kinds of jobs to be stored on extension computing device 102, a full RIP system is needed. RIP firmware 322 allows for parsing, interpretation, and rendering of the non-critical print jobs sent to extension computing device 102. RIP firmware 322 also keeps the print jobs in storage 303, shared network or cloud storage, to make the print jobs available later to MFP 104 to pull the data for on-demand printing.

RIP firmware 322 may be the same version as the RIP firmware within MFP 104 for direct compatibility. Alternatively, RIP firmware 322 may be a different version that is upgradeable. It also may happen that the version of RIP firmware 322 is older than the version in the connected MFP 104. As long as RIP firmware 322 can generate and render images on a compatible format that MFP 104 can process to render to paper, RIP firmware 322 is still a valuable component of extension computing device 102. It may save MFP 104 from processing non-urgent print jobs that are intended for on-demand printing.

PDL interpreter 330 performs the parsing and processing of the print jobs managed by print job manager 320. The page description languages supported by extension computing system 320 and extension computing device 102 are those that are newer versions or more up-to-date versions of the PDL interpreters already installed and supported by the firmware of engine 106. PDL interpreter 330 also may be a totally different, new, and unsupported PDL interpreter from the one installed for engine 106. In this latter scenario, PDL interpreter 330 may be a new technology provided by extension computing device 102. It may be a new XPS interpreter, a new PDF interpreter, a personalized print markup language (PPML) interpreter, or some future PDL processor. In some embodiments, extension computing system 300 may have access to several PDL interpreters that it calls on the one related to needs of MFP 104 and network 108.

Graphics rendering component 332 is the second sub-component of RIP firmware 322. PDL interpreter 330 interacts with graphics rendering component 332 for the translation of PDL commands to generate a graphics order list. The graphics order list is a list of graphics orders. It is a low-level binary data similar to assembly language or computer machine language. The graphics orders are the actual configuration and drawing commands that may be executed and processed by engine 106. Graphics rendering component 332 may produce a logical representation of the page for the document, which is a raster image or some other encoded representation. In some embodiments, graphics rendering component 332 may execute and process the graphics orderlist to generate several bands of data that can be downloaded to engine 106 of MFP 104 for final processing to put markings on the paper.

Output from graphics rendering component 332 may be packaged in at least three ways to engine 106. One way may be the PDL print jobs (PCL5, PCLXL, XPS, PDF, JPG, PNG, TIFF, and the like) translated so that the target MFP 104 or printer engine 106 can process. A second way is to package the output data as a logical binary representation of the page consisting of purely graphics orders. When downloaded to MFP 104, the representation may be processed through the hardware image rendering components such as an Application-Specific Integrated Circuit (ASIC), a Raster Processing Unit (RPU), and a Graphics Execution Unit (GEU).

Another way may be a wrapped raster image in a new kind of print job that can be processed directly at MFP 104 or printer engine 106. The raster image is the binary data representation of the incoming print job after getting processed through PDL interpreter 330 and graphics rendering component 332. It is possible to generate a compressed raster image that can be downloaded to engine 106 that would allow MFP 104 to skip further RIP processing. The raster image may be directly processed for putting marking or ink onto the paper when printing. This action is disclosed in greater detail below.

In some embodiments, RIP firmware 322 may be a duplicate of the RIP firmware within MFP 104. This does not have to be the case. RIP firmware 322 may be a more up-to-date firmware that is not dependent on the model of the hardware of MFP 104. This may be achieved based on upgradeability of RIP firmware 322 within extension computing device 102, which is easier and cheaper to accomplish than upgrading the RIP firmware on MFP engine 106.

Extension computing system 300 also includes extension engine 324. Extension engine 324 is a management mechanism for the main extension computing system 300 features and functionalities. Extension engine 324 communicates with the connected MFP 104 for responding to data and processing requests. It also supports for management, launch, and coordination with firmware applications system services 326. Extension engine 324 also may upgrade itself with a new version from server 114 or cloud storage 116 via network 108. Extension engine 324 also downloads and installs firmware upgrades for connected imaging devices, if permitted.

Extension engine 324 may receive at least two types of data for print jobs. These print jobs may be called extension command "print jobs" and PDL print jobs. The print jobs differ in what each one has extension computing device 102 accomplish. Some may instruct extension computing system 300 to perform specific operations while others just may send instructions to MFP 104. Extension engine 324 determines the type of print job received and acts accordingly. The functions associated with each type of data are disclosed in greater detail below.

An extension command print job may be received from administrators, computers, devices or mobile devices connected to network 108. These commands may call on extension computing device 102 to perform certain operations on extension engine 324, or engine 106, such as upgrades and launches. Extension computing system 300 will execute the operations. An upgrade command instructs extension computing system 300 to perform a firmware upgrade and may have syntax relating to an upgrade path or the like. The path parameter may be optional and is for the path to firmware upgrade package. In other words, "path" directs extension computing system 300 where to obtain the firmware upgrade package in system 100. If there is no "path" parameter, then extension computing system 300 will look for the firmware upgrade package from a designated local server, such as server 114, an original equipment manufacturer (OEM) website, or safe internet/cloud storage 116. As a stand-alone extension computing device 102, a new tool is capable to perform firmware upgrades on connected imaging devices, such as MFP 104.

Another command for extension computing system 300 may launch firmware application services. This command may have syntax of launch app_service_name. The parameter "app_service_name" is desired to determine the service application to launch. There may be several firmware application services that are developed and hosted on extension computing device 102. Examples of launch commands may be launch scanner mobile service application or launch document converter service application.

Other extension commands may be developed, integrated, and implemented for extension computing system 300. These commands may instruct extension engine 324 to perform other printer engine management routines or launch other firmware application services. The launched firmware application services would interface with offloaded applications with which MFP 104 can interact in external computing devices, such as smartphones, laptops, tablets, desktops, and the like. The external firmware applications will be able to perform the implied functionalities for processing external documents. In other words, the mobile applications act as printer software that cooperates with extension computing device 102 to download or process a job on the connected MFP 104. This process is disclosed in greater detail below.

Because extension commands will be received through the same channels of PDL print jobs, extension computing engine 324 must have a way to distinguish the print jobs from each other. Extension commands, however, should be packaged to work within the current PDL print job framework so that they look like any other PDL print jobs. Thus, extension commands may have a header section and trailer section that wrap the main extension engine commands. The sections include header data and trailer data that identify the data segment as a special extension command "print job" so that extension engine 324 and extension computing system 300 can act accordingly.

For example, a possible extension command "print job" may be:
!EXT!
Command [parameter]
!EXT!

The header data is an encoded start identifier. The trailer data is an encoded end identifier. This feature may be enhanced and re-defined further to use other encoding, encryption, and formatting standards, such as the use of XML or HTML formatting. It also is possible to include more than one extension command between the header and trailer sections. Extension engine 324 may do a pre-parsing of the header data to identify whether the incoming print job data is a PDL print job or an extension command print job. Some examples of extension command operations may be as a firmware upgrade, a mobile scanning and print operation, or document conversion. These examples processes are disclosed in greater detail below.

An administrator may have a firmware upgrade to be deployed on MFP 104. The administrator may send an instruction to extension computing device 102 that is connected to MFP 104 to be upgraded. The instruction may contain relevant data such as command, which is "upgrade," and the value or parameter, which is the path to the firmware upgrade package. It also may be just an "upgrade" command without any extra parameter. Extension engine 324 then will query and download the firmware upgrade from its associated file server 114 in network 108, download it from the OEM server, or download it from a location within cloud storage 116.

For the mobile scanning example, a printer may be implemented that has no scanning support or an MFP that has broken scanning hardware. User may be able to use a mobile scanning application to scan original documents with a mobile device, download the photographed copy to the scanning application service in extension computing device 102. The disclosed embodiments, in turn, will save or make a print-out of the scanned document.

Extension engine 324 also receives PDL print jobs from components within system 100. Print jobs are received, as scheduled, from print job manager 320. If the print job request is a regular print job, then extension computing device 102 treats it like a normal print job would be treated at MFP 104, except with some differences. Extension engine 324 may either process PDL print jobs locally in extension computing device 102 through RIP firmware 322 or relay them down, or pass-through, to MFP 104.

Extension computing system 300 also includes input/output and communication layer (hereinafter communication layer) 328, which may be an interface layer for management of connected devices, both input and output. This may be through device drivers 305, operating system 306, a TCP/IP interface, or other connectivity technologies. The input aspect is for networking connectivity by interfacing with print job manager 320 for the receipt of the print jobs, responding to queries for system capabilities, and coordinating and communicating between firmware application system services 326 and external mobile application clients. The output aspect is for interfacing with the connected printing or imaging device, such as MFP 104 or engine 106. Communication layer 328 also transmits or downloads a rendered or pass-through print job within extension computing system 300. Communication layer 328 may connected to MFP 104 through a wired, wireless, or direction connection, shown as connectors 310 in FIG. 3.

Portable printing computing system 300 also includes firmware applications system services 326. As fully functional computing device with operating system 306, storage 303, memory 304, device drivers 305, processor 302, and networking connectivity through input 312 and output 314, software services can be hosted, function, and operate in device 102. Various non-critical processes from MFP 104 and engine 106 may be offloaded. These processes are transferred and developed as system services in extension computing device 102. Some of the possible application services may be document storage, user account management, job accounting management, web services, and diagnostic tools.

Document storage, or job storage, is the rendering of incoming print jobs that are not printed onto paper or other medium, but are stored in storage 303 as hard-drive or system storage for later printing. These kinds of print jobs are performed partially in MFP engine 106 through the following current workflow:

1) PDL Interpretation,
2) graphics rendering component processing for the generation of graphic orders,
3) processing of graphics orders through ASIC or other hardware component technologies, and
4) storing of rendered image(s) into system storage 303.

Once the pre-rendered print jobs are stored in extension computing device 102, the data can be pulled or retrieved for on-demand printing. The externally stored pre-rendered print jobs may be browsed at operations panel 208 for MFP 104 to select which print job to print, delete, rename, and the like.

In some embodiments, the graphics order may be processed in MFP 104 or engine 106. The only step from above that needs to happen in engine 106 is the third step because it requires hardware components, like the ASIC, that exists in MFP 104. The rest of the steps may be performed in extension computing device 102. The time saved by offloading the other three steps and doing them externally of MFP 104 would allow it to have more time and availability to process real print jobs that would printed onto paper or another medium.

In other embodiments, the graphics order may be processed in software emulation. It is possible to perform software emulation of the hardware components within MFP 104. The hardware components, like ASIC, started in software form during development, and were eventually ported and programmed in integrated chips or ASIC. Thus, most, if not all, features of ASIC may have equivalent software implementations. This may be called a software graphics execution unit (GEU). This processes the graphics orders from step 2 above to be able to create the rasterized image. In these embodiments, all of the four steps may be performed in extension computing device 102. Processing in MFP 104 or engine 106 may be skipped. This feature allows MFP 104 or engine 106 to have more resources and time available for processing real print jobs.

With user account management, user account and other user data do not need to reside locally in MFP 104. This data do not require hardware components used for image processing. A common user account management system may be offloaded in extension computing device 102 and shared among several imaging devices when connected to each one or when remotely accessed from many imaging devices.

A different management system is job accounting. Job accounting does not need to reside locally in MFP 104, either. It does not require hardware components for image processing. The job accounting management system may be offloaded and hosted in extension computing device 102.

Web services also may be offloaded from MFP 104. The management of configuration, paper, and user settings usually is implemented as a web service on MFP 104. These services do not need to be in MFP 104 and may be hosted in extension computing device 102.

Diagnostic tools for debugging, monitoring, or maintenance of MFP 104 also may be offloaded and performed on extension computing device 102. By doing this, computing power is not consumed inside MFP 104. Further, the diagnostic tools may be upgraded without tying up resources on MFP 104.

In some embodiments, it is possible to develop new applications and services that generate rendered document images in raster formats or other formats compatible to imaging devices. For this to happen, a method for communication and coordination between existing MFP firmware and extension computing device 102 will do. The method will involve passing and handling of instructions between the two devices to facilitate the transfer of document data and the rendered document images.

Extension computing device 102 may have a web service or application that administrators can access to launch, restart, or perform the various capabilities available and installed in the extension computing device. This will allow administrators to manage extension computing device 102 remotely, and not just the MFP features and firmware application system services 326 installed within.

Figure 4:
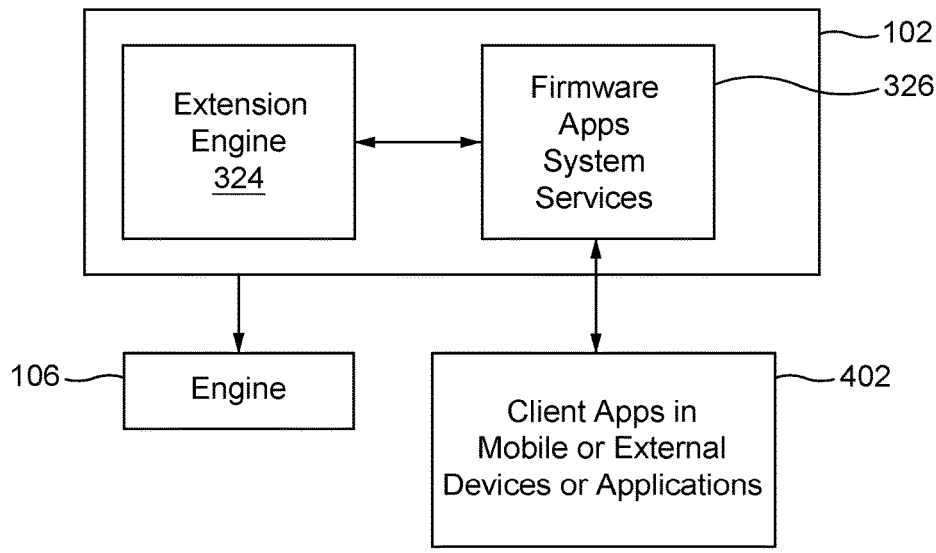
FIG. 4 illustrates a block diagram of the components for use with firmware applications system services according to the disclosed embodiments.

A server-like system services component is integrated into extension computing device 102, and managed through extension engine 324. By interfacing with extension engine 324, firmware application system services 326 can run locally in extension computing device 102, as shown in FIG. 4. The applications of firmware application system services 326 can have varied features as disclosed above. Application interface (API) services are provided to clients that would be external to extension computing device 102, such as components connected through network 108, or client applications 402. Client applications 402 may reside on mobile devices 110 or computers 112. As discussed above, client applications 402 may act as an extension to engine 106 via extension engine 324 in that functionality is provided by the external applications to perform operations using the engine in MFP 104.

MFP 104 receives the output data from extension computing device 102. MFP 104 and engine 106 process the data like other incoming print jobs or communications from network 108. In some embodiments, no change on the hardware or firmware components of MFP 104 or engine 106 is required for upgrades as extension computing device 102 provides the new features and capabilities to the existing device.

It is possible to integrate technologies defined in the disclosed technology in order to enhance and improve the performance and processing efficiency of the interaction between MFP 104 and extension computing system 300. For example, engine 106 of MFP 104 may have an upgraded firmware that communicates with a connected extension computing device 102. All incoming print jobs that extension computing device 102 will process can be formatted in a certain way that is compatible with the upgraded interaction and communication path. The print jobs also are processed more efficiently when received at MFP 104.

Figure 5:
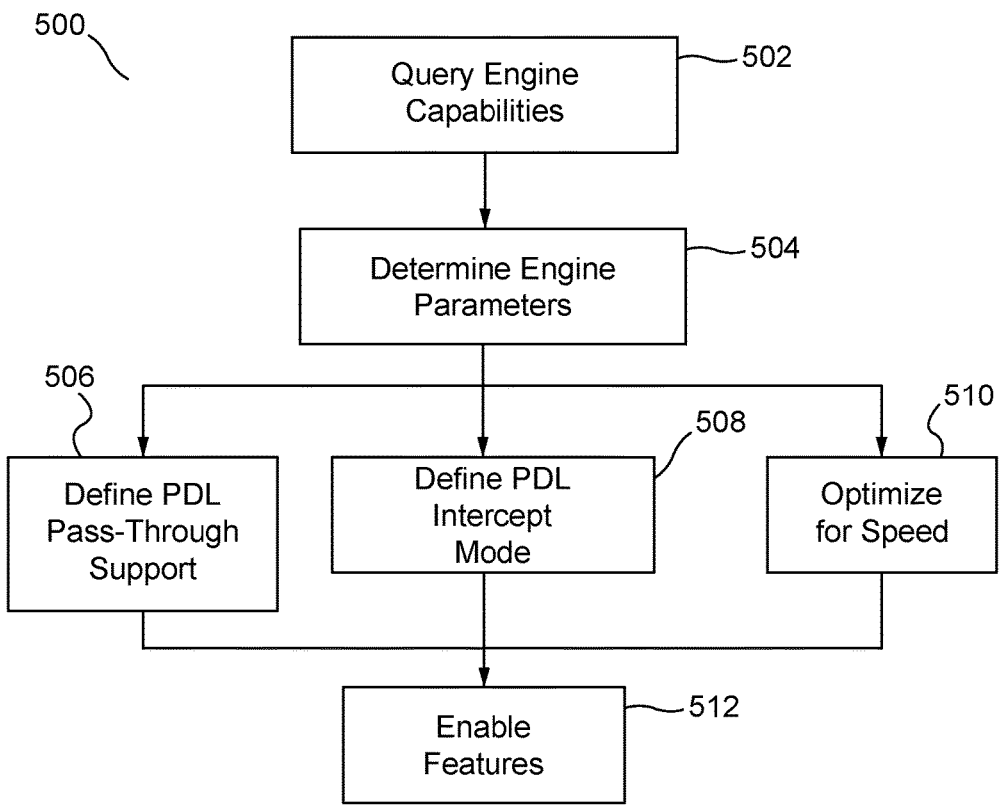
FIG. 5 illustrates a flowchart for configuring an extension computing device when connected to an MFP according to the disclosed embodiments.

FIG. 5 depicts a flowchart 500 for configuring extension computing device 102 when connected to MFP 104 according to the disclosed embodiments. Whenever extension computing device 102 is connected to an imaging device, such as MFP 104, it will configure itself in order to determine and enable its features and capabilities. Extension engine 324 may use the data about the connected imaging device to determine how it will function. Flowchart 500 shows the steps used to complete the configuration.

Each MFP 104 comes with pre-installed engine firmware and other firmware. The firmware may be of a particular version at the time MFP 104 is brought on-line. The firmware components may be upgraded after MFP 104 is shipped. Moreover, all MFPs and devices become old or obsolete. Future versions of the firmware may include features, bug fixes, enhancements, and the like. The new upgrades may not be backward compatible with existing firmware on MFP 104. The upgrades are known to the MFP manufacturer and may be catalogued at the factory or other location. A mapping of firmware versions may be provided at the factory, for example, and then contained in a server or on the internet/cloud. It may be in a database and shared through queries using SQL connections and other methods. In other words, the firmware upgrades and associated information may be accessible at a storage location on network 108 by extension computing device 102. Alternatively, it may be possible to package this data and include it when setting up extension computing device 102, either as a resource file or statically linked with its software components.

Step 502 executes by querying engine capabilities. Extension computing system 300, and more specifically, extension engine 324, can query for the mapping of firmware versions and associated data from a server, such as server 114, in order to determine what PDLs and technologies are enabled for MFP 104 and engine 106. It also may query what limitations, restrictions, concerns, and the like might apply to MFP 104. For example, extension engine 324 queries for engine firmware versions, capabilities, and other relevant information in order to determine necessity for firmware upgrades or for determining what PDLs are supported on engine 106.

In some embodiments, the data may be included in extension computing device 102 as static data. The static data may be a separate resource file stored in memory 304 or can be statically linked with extension computing system 300. Extension engine 324 may query only server 114 for data that is newer than what is already included locally in device 102. In other words, extension engine 324 may determine whether data about MFP 104 also needs to be upgraded.

Step 504 executes by determining engine parameters for engine 106 of MFP 104. Extension engine 324 receives and processes data for its queries for engine restrictions, limitations, features, and other capabilities. With this data, extension engine 324 effectively "knows" the capabilities, or lack thereof, of connected MFP 104. It may use this knowledge to provide and enable new features, enhancements, and upgraded capabilities and technologies to MFP 104.

This step also may be referred to as defining rules and capabilities. Extension engine 324 may define at least three rules and capabilities. These may be shown in steps 506-510. Step 506 executes by defining PDL pass-through support. PDL pass-through support is enabled for PDLs that are known to be working on MFP 104 and have no critical issues. Print jobs may pass through extension computing system 300 as normal, and may even go directly to communication layer 328 for output to MFP 104. Newer firmware versions or upgrades are not detected.

If the local PDL is known to have critical issues either in firmware or hardware, extension engine 324 may intercept incoming print jobs with the compromised PDL. Extension engine 324 processes the print jobs locally in portable printing computing system 300 through RIP firmware 322. It then sends the print job to MFP 104 for processing. Though PDL pass-through support is enabled because MFP 104 includes the proper version of the local PDL, extension engine 324 determines that the local PDL is corrupt, possibly due to ASIC, halftone, hard-drive, or ROM memory corruption and institutes this intercept mode. Extension engine 324 may receive information about the local PDL from MFP 104.

Step 508 executes by defining the PDL intercept mode by extension engine 324. The PDL intercept mode is similar to what is defined above. The print job for a PDL is intercepted and processed by extension computing system 300. It is not passed through to MFP 104. If a new version of PDL is available for print job processing that is better than what is installed on MFP 104, then extension engine 324 will intercept the print jobs with the PDL. The print jobs are processed locally on extension computing device 102. Once processing is complete, the print job is output to engine 106.

Step 510 executes by optimizing for speed. If the rendering capabilities of engine 106 can be determined, then extension engine 324 may enable generation, translation, or conversion of incoming print jobs to a format that is processed more efficiently on engine 106. For example, if extension engine 324 determines that MFP 104 includes a version 2.3 of some compression and decompression algorithm in the application-specific integrated circuit (ASIC) of the MFP, then the extension engine will inform RIP firmware 322 in extension computing system 300 about such version. RIP firmware 322 would translate and convert applicable incoming print jobs not going through pass-through mode to generate the raster image representation of the pages in a format compliant to version 2.3 of the known compression and decompression algorithm in the ASIC of MFP 104.

Other rules may be enabled or disabled in order to take advantage of the processing power and upgraded features in extension computing device 102. Examples of these rules may be defining and enabling restricted user access. Some users may not be able to use MFP 104 and these rules may change over time. Device 102 can enforce these rules using extension engine 324. Another example may be enabling document storage permissions. Rules also may include defining and assigning color or monochrome printing access on MFP 104. In other words, rules that apply to what or who can access MFP 104 may be enabled using device 102 according to the disclosed embodiments.

Step 512 executes by enabling the features. Once extension computing device 102 is configured and the rules are defined, it will apply and perform the rules as print jobs are received. Extension engine 324 will treat print jobs accordingly. Device 102 also may receive commands from administrators, such as pushed firmware upgrades. In this situation, a firmware upgrade may be received at device 102. This may cause extension engine 324 to move a local PDL from a pass-through parameter to an intercept mode one.

Figure 6:
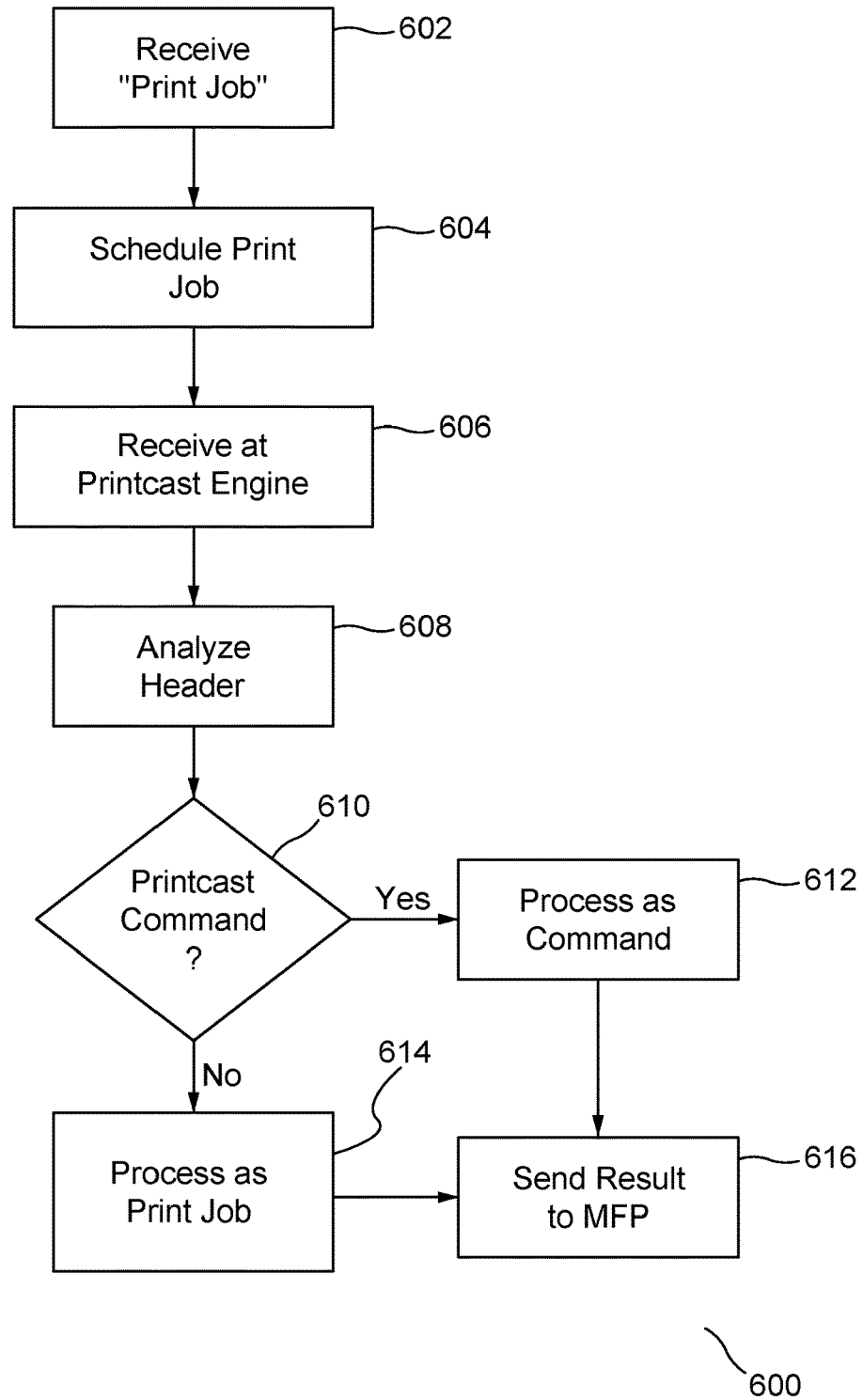
FIG. 6 illustrates a flowchart for processing a print job or an extension command using the extension computing device according to the disclosed embodiments.

FIG. 6 depicts a flowchart 600 for processing a print job or an extension command using extension computing device 102 according to the disclosed embodiments. Flowchart 600 shows what happens when extension computing device 102 receives data from another device within system 100. In some embodiments, an external device connected over network 108 sends the data to have some action performed, such as printing a document or asking device 102 to perform a process. Step 602, therefore, executes by receiving a "print job" from an external, remote, or connected device or application. As disclosed above, extension computing device 102 may be selected as a destination for the print job or action, like a printer or MFP 104. The term "print job" is used but this refers to real PDL print jobs as well as extension commands.

Step 604 executes by scheduling the print job using print job manager 320. Print job manager 320 receives the print job request and schedules it accordingly. This is one reason all incoming requests are treated as "print jobs" in that they are scheduled as such. The jobs are processed in order. For example, extension commands may not be given preferential treatment over normal print jobs. Step 606 executes by receiving the print job at extension engine 324 when it is scheduled for processing. Extension engine 324 analyzes the print job to determine how it will be treated in extension computing device 102.

Step 608 executes by analyzing the header of the print job. As disclosed above, the print job may include a specific header that identifies it as an extension command. The header data includes an encoded start identifier, such as "!EXT!" in hexadecimal form. This alerts extension engine 324 that the print job actually includes an extension command for extension computing system 300. After the header is determined, step 610 executes by determining whether the print job includes an extension command using extension engine 324. In some embodiments, the print job can include a plurality of extension commands.

If step 610 is yes, then extension engine 324 will process the print job as an extension command. Extension engine 324 will task components within extension computing system 300 to perform the functionality specified in the command or launch applications within system 300 to accomplish tasks.

If step 610 is no, then extension engine 324 will treat the print job as a normal PDL print job. Extension engine 324 may determine the version of PCLXL or PDF interpreter already supported in engine 106 of MFP 104. With this information, extension engine 324 may allow incoming PCLXL and PDF print jobs to pass-through and processed directly by MFP 104. If for any reason the version installed on engine 106 has a known bug that cannot be fixed with a firmware upgrade or there is some lack of support by engine 106, then the disclosed embodiments may process incoming print jobs in extension computing device 102 by pre-rendering it, and downloading only compatible data to MFP 104. It also may store the document for later use. Thus, incoming jobs identified as print jobs in step 610 may be processed in step 614 either by sending directly to engine 106 or processed in device 102. Further, if the intercept mode is enabled, as disclosed above, then the print job will be intercepted and stored by device 102.

Step 616 executes by sending a result of steps 612 or 614 to MFP 104, if applicable. The result may be data generated from the actions of extension computing system 300 either from the extension command or PDL print job. The result is the data provided to MFP 104 due to the interaction of extension computing device 102 with the incoming request from an external device. The data may be upgraded firmware to be deployed on MFP 104 or a processed document for printing. In some embodiments, the data is in a format usable by engine 106 or MFP 104. The result comes from communication layer 328 that communicates with MFP 104.

Figure 7:
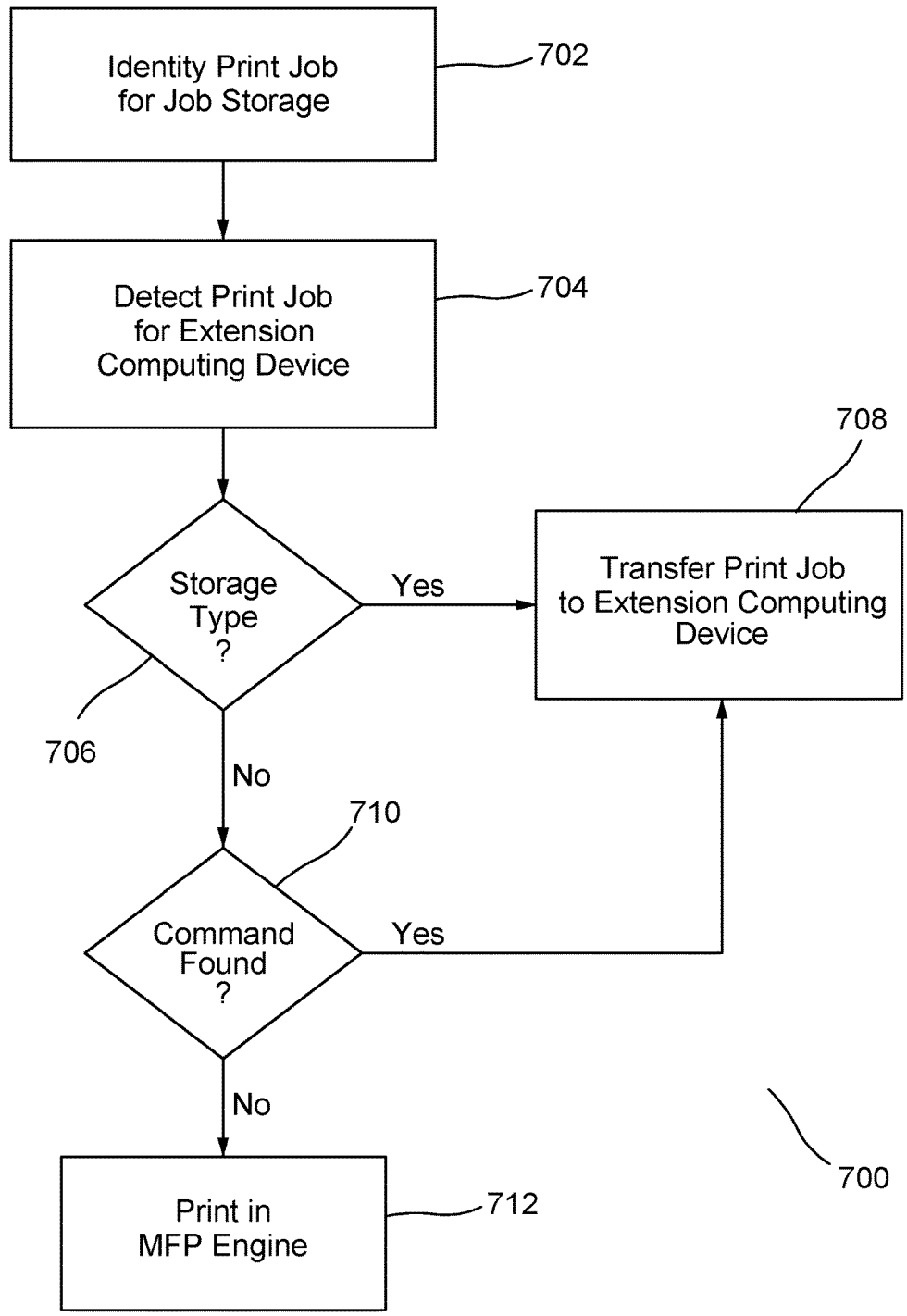
FIG. 7 illustrates a flowchart for processing a print job for a document or job storage at an MFP according to the disclosed embodiments.

FIG. 7 depicts a flowchart 700 for processing a print job for a document or job storage at MFP 104 according to the disclosed embodiments. As noted, flowchart 700 shows the process to handle a print job or other operation as it is received at MFP 104. In some embodiments, the print job is received at extension computing device 102 then passed through to MFP 104 according to the rules applied by extension engine 324 to intercept certain print jobs to be processed using extension computing system 300. A printer driver identifies print jobs with a document storage parameter. Using the example above, an extension command may be found in the header to alert MFP 104 or extension engine 324 that the print job is to be stored in the extension computing device. A printer driver may add a type for the print job, whether it is for normal printing or for job storage. It may accomplish this in the current, normal way.

There also may be a need for the printer driver to identify print jobs as print jobs for extension computing device 102. In these instances, the printer driver includes the PJL RELAY command when it knows that the print job may be processed in extension computing device 102. This action may be performed when extension computing device 102 hosts upgraded or upgraded firmware to process the print job. Extension computing device 102 also may include firmware applicable to third party printers in that it can receive and process a print job for a printer different from the connected MFP 104.

Step 702 executes by identifying the print job as one for job storage. In some embodiments, this step may be done at the printer driver at a device to send the print job to MFP 104. The print job is marked for job storage or document storage, or includes a PJL RELAY command. Step 704 executes by detecting that the print job is to be forwarded to extension computing device 102 by MFP 104. MFP firmware detects the type of job (normal printing or job/document storage) or the presence of the PJL RELAY command. The MFP firmware may determine whether such information exists by reviewing the header.

Step 706 executes by determining whether the print job is a job or document storage type print job. If yes, then step 708 executes by transferring the print job to extension computing device 102. Further actions by extension computing device 102 are disclosed in FIG. 8. If step 706 is no, then step 710 executes by determining whether the PJL RELAY command, or any other applicable command, is found in the print job. If yes, then step 708 executes as disclosed above. If step 710 is no, then step 712 executes by printing the print job in MFP 104 using the associated MFP firmware and engine 106.

Figure 8:
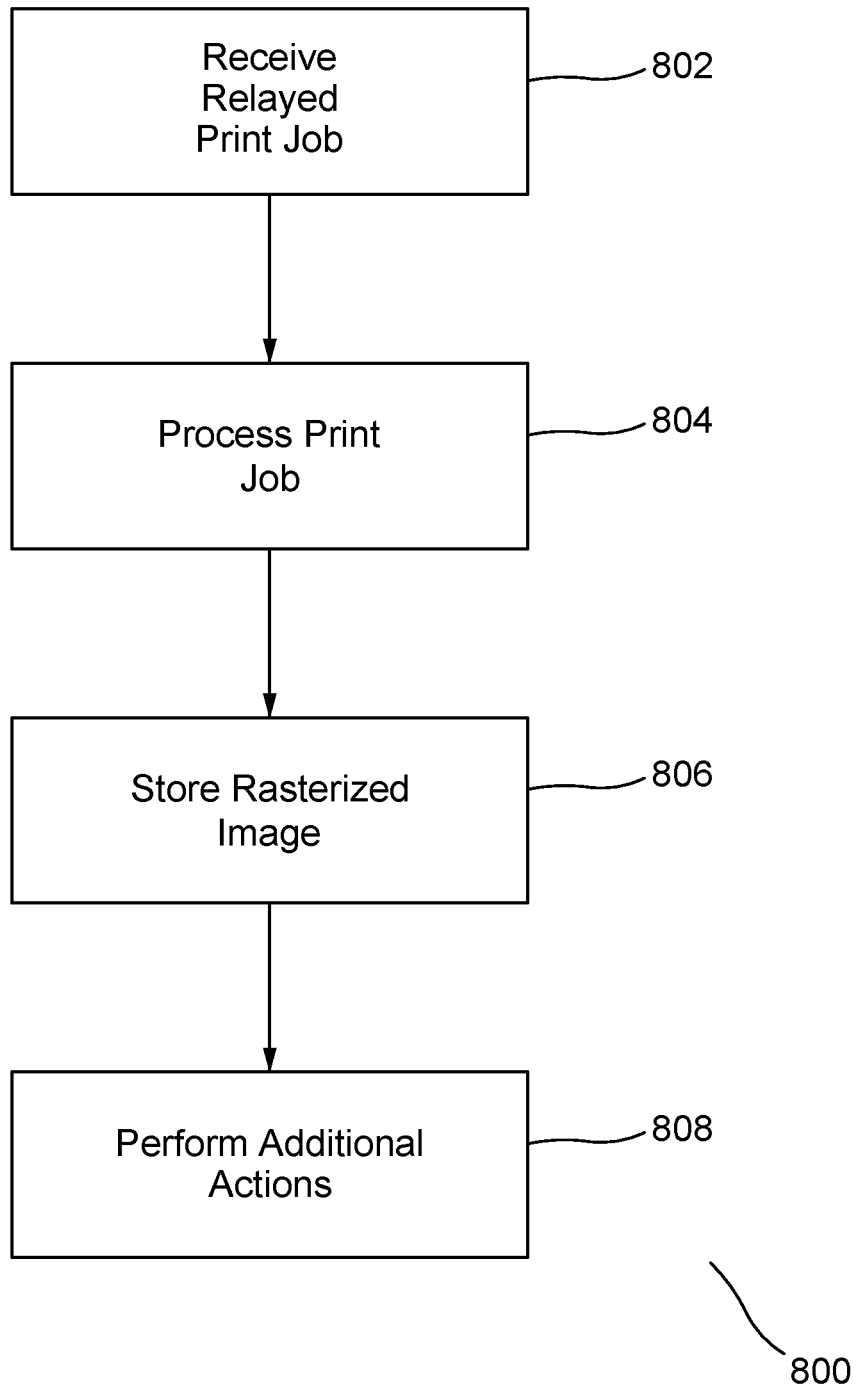
FIG. 8 illustrates a flowchart for processing a print job for a document or job storage at an extension computing device according to the disclosed embodiments.

FIG. 8 depicts a flowchart 800 for processing a print job for a document or job storage at extension computing device 102 according to the disclosed embodiments. Flowchart 800 proceeds in conjunction with flowchart 700. Once step 708 is executed, then the steps of flowchart 800 are executed. Extension computing device 102 receives the transferred job from MFP 104. It processes the job and stores the rendered image locally in, for example, storage 303. Extension computing device 102 may have an API or file server application that can transfer the rendered image programmatically.

Step 802 executes by receiving the relayed print job from MFP 104 after the determination is made in step 706 or 710. Step 804 executes by processing the print job in extension computing device 102. The components of extension computing system 300 may process the print job using RIP firmware 322 as disclosed above. In other words, the print job is processed as if it was being processed in MFP 104. This feature alleviates the need for MFP 104 and its associated firmware to process print jobs that are not urgent.

Step 806 executes by storing the rendered image within extension computing device 102. In some embodiments, the rendered image is stored in storage 303. Unlike memory 304, storage 303 may be an internal hard drive, an external hard drive, cloud or network storage, and the like. By not using memory 304, the processing capabilities of extension computing device 102 are not compromised. Step 808 executes by performing any other actions as instructed by the print job. Such actions may include sending a confirmation to the printer driver that storage is complete. Other actions may include displaying the document image on MFP 104 for editing or changes on the document, which then may be saved as a new document or replace the original document.

Figure 9:
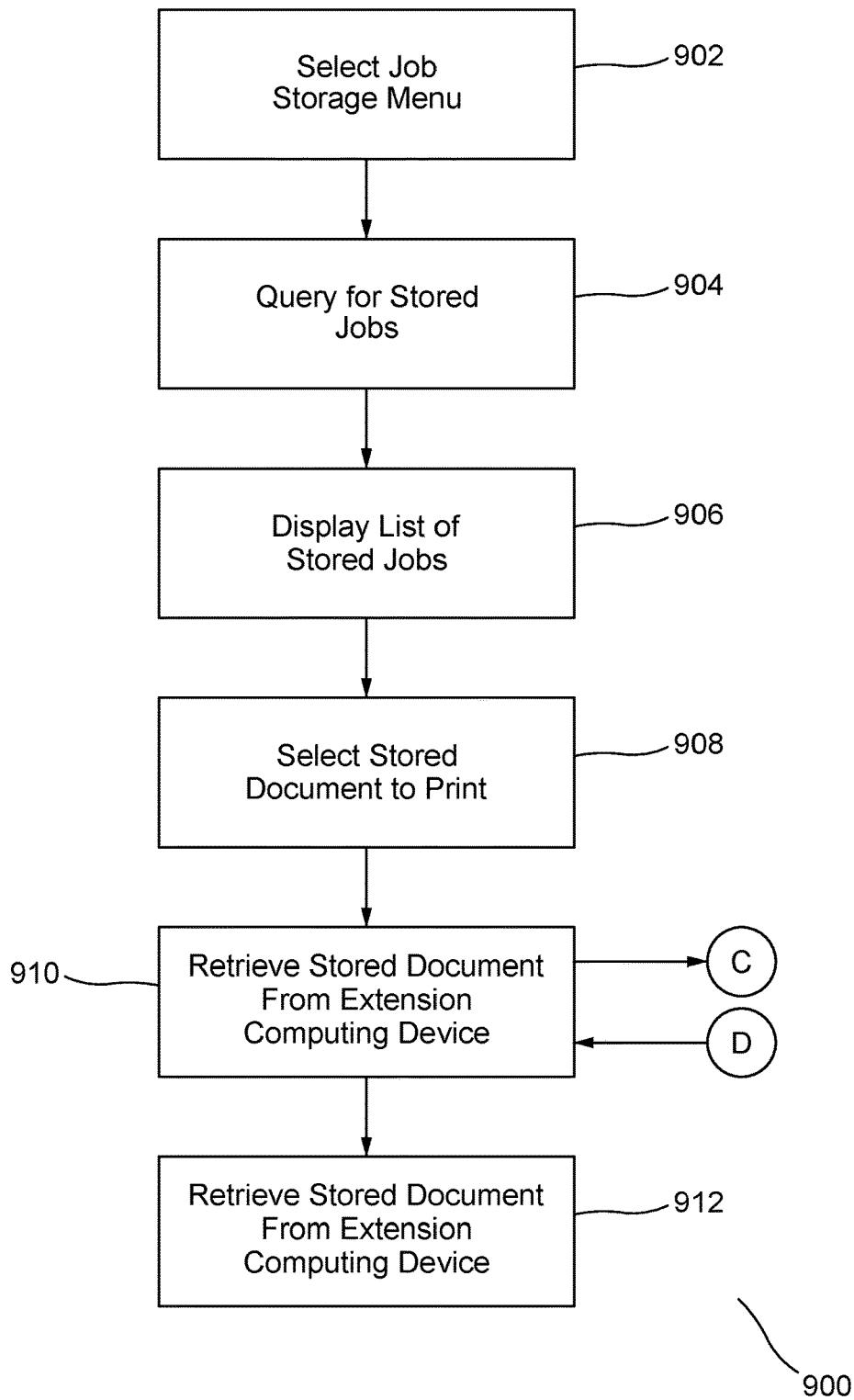
FIG. 9 illustrates a flowchart for performing on-demand printing or document retrieval at an MFP according to the disclosed embodiments.

FIG. 9 depicts a flowchart 900 for performing on-demand printing or document retrieval at MFP 104 according to the disclosed embodiments. MFP 104 may pull data from extension computing device 102. This data may be stored jobs processed in flowchart 800. If a user needs to perform an on-demand or pull printing operation, then MFP 104 may need the data such as for document storage. MFP 104 sends an instruction to extension computing device 102 to pull or download the data.

Step 902 executes by selecting the job or document storage menu by the user. This action may be performed at MFP 104, but also at a connected device, such as one connected via network 108. Step 904 executes by querying extension computing device 102 for stored jobs or documents. Flowchart 900 may do this by executing step A which interacts with flowchart 1000, as disclosed below. MFP 104 will wait for the response from extension computing device 102. Step B returns the result of the query from extension computing device 102 to flowchart 900.

Step 906 executes by displaying the list of selected jobs on MFP 104. For example, the list of selected jobs may be displayed in display unit 216 of operations panel 208. The user may interact with the list using input panel 217. Step 908 executes by selecting a stored document or documents to print using MFP 104. Using input unit 217 and display unit 216, the user indicates the documents to print.

Step 910 executes by retrieving the stored document or documents from extension computing device 102. The retrieved documents are downloaded to MFP 104. Step C interacts with flowchart 1000 to obtain the selected document(s). The documents are stored on extension computing device 102 and provided to MFP 104 using step D, which also interacts with flowchart 1000. In some embodiments, the retrieved documents already are rasterized images that may be sent directly to engine 106 without the need for MFP firmware processing. This feature alleviates the processing demands on MFP 104. Step 912 executes by printing the document using MFP engine 106.

Figure 10:
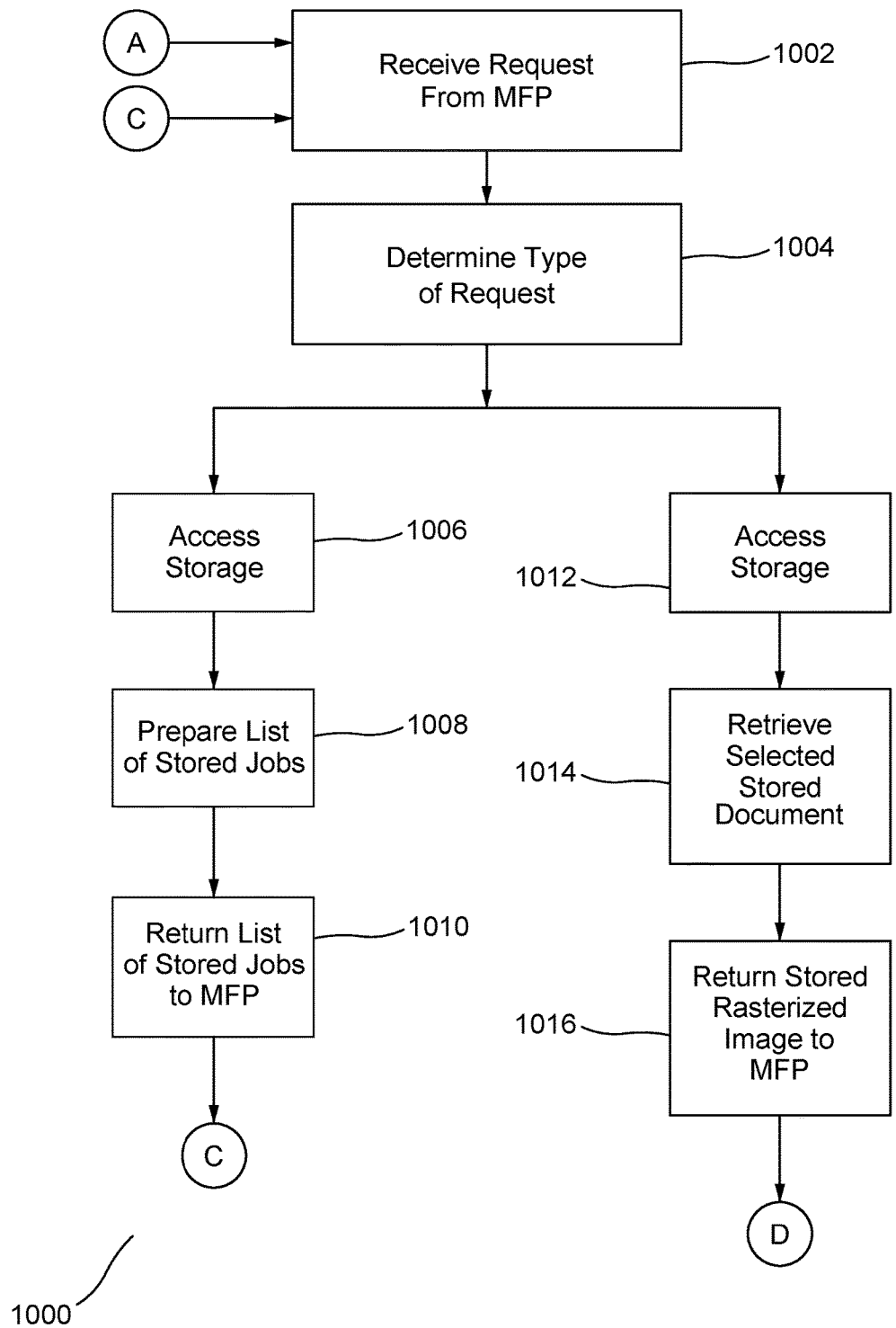
FIG. 10 illustrates a flowchart for performing on-demand printing or document retrieval at an extension computing device according to the disclosed embodiments.

FIG. 10 depicts a flowchart 1000 for performing on-demand printing or document retrieval using extension computing device 102 according to the disclosed embodiments. Flowchart 1000 interacts with flowchart 900 using steps A and C as MFP 104 sends commands and requests to extension computing device 102, which acts accordingly. Extension computing device 102 returns the rendered image to MFP 104. Thus, when extension computing device 102 receives a "pull," or similar, request from MFP 104, it transfers or returns the requested document image from storage 303.

Step 1002 executes by receiving the request for the document(s) at extension computing device 102 from MFP 104. Alternatively, the request may come from MFP engine 106. Step 1004 executes by determining the type of request received. Although flowchart 1000 disclosed two types of requests, other requests may be received such as displaying the stored document within display unit 216 of MFP 104 or forwarding the document to another device over network 108.

If the request is from step A, then it pertains to a query for stored jobs in extension computing device 102. Step 1006 executes by accessing storage 303. Access also may be performed for an external device or cloud/network storage. Extension computing device 102 may send a request to the other device over network 108 to obtain the jobs stored on the device. Step 1008 executes by preparing a list file of the stored jobs for the user. Step 1010 executes by returning the list file of stored jobs to MFP 104. Step B interacts with flowchart 900 to provide the list of stored jobs (or documents) to step 904.

If the request is from step C, then it pertains to retrieving for one or more stored documents in extension computing device 102. Step 1012 executes by accessing storage 303. Access also may be performed for an external device or cloud/network storage. Extension computing device 102 may send a request to the other device over network 108 to retrieve the requested documents stored on the device. Step 1014 executes by retrieving the selected stored documents from storage 303 or the applicable storage. Step 1016 executes by returning the stored rasterized image to MFP 104. Step D interacts with flowchart 900 to provide the rasterized image(s) to MFP 104 for printing.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. An extension computing device for processing documents for printing at a multi-function printing (MFP) device connected to a network, the extension computing device comprising:
    a print job manager to schedule a print job received over the network;
    an extension engine to determine whether the print job includes an extension command, wherein the extension command causes the MFP device to transfer the print job to the extension computing device;
    a raster image processing (RIP) firmware to process a page description language (PDL) print job from the print job manager to generate a document image, wherein the extension command indicates that the PDL print job is not executable by printer RIP firmware within the MFP device;
    a communication layer to interface with the external device and the MFP device; and
    a storage to store the document image also in accordance with the extension command,
    wherein the extension engine performs a function within the extension computing device to retrieve the stored document image to print on the MFP device, and
    wherein the extension computing device is detachably connected to the MFP device.

2. The extension computing device of claim 1, further comprising a power supply.

3. The extension computing device of claim 2, further comprising connectors to connect the power supply to the MFP device.

4. The extension computing device of claim 1, further comprising at least one firmware application system service that is launched by the extension engine.

5. The extension computing device of claim 4, wherein the at least one firmware application system service includes a document storage service.

6. The extension computing device of claim 1, further comprising an operating system to execute within the extension computing device.

7. The extension computing device of claim 1, further comprising a memory to store the print job received from the MFP device prior to action by the print job manager.

8. A method for processing a print job at an extension computing device detachably connected to a multi-function printing (MFP) device, the method comprising:
   receiving a print job from the MFP device, wherein the print job includes an extension command;
   determining, using an extension engine, that the print job is to be sent to the extension computing device instead of the MFP device according to the extension command;
   processing the print job at the extension computing device using a print job manager and a raster image processing (RIP) firmware within an extension computing system on the extension computing device to generate a rasterized document image, wherein the extension command indicates that the PDL print job is not executable by printer RIP firmware within the MFP device; and
   storing the rasterized document image within a storage accessible by the extension engine of the extension computing device also in accordance with the extension command.

9. The method of claim 8, further comprising retrieving the rasterized document image from the storage when instructed by the extension engine.

10. The method of claim 9, further comprising obtaining an upgrade for the RIP firmware from a source over the network.

11. The method of claim 8, further comprising accessing the storage, wherein the storage is within the extension computing device.

12. The method of claim 8, further comprising providing a list including the rasterized document image to the MFP device.

13. The method of claim 9, further comprising printing the retrieved rasterized document image at the MFP device.

14. A method for using an extension computing device to print a document at a multi-functional printing (MFP) device, the method comprising:
   analyzing a header of a print job;
   determining whether the print job includes an extension command for document storage according to the header;
   transferring the print job to the extension computing device from the MFP device according to the extension command, wherein the extension command indicates that the print job is not executable by printer firmware on the MFP device;
   processing the print job at the extension computing device to generate a rasterized document image using a raster image processing (RIP) firmware within the extension computing device to render the rasterized document image according to the extension command;
   storing the rasterized document image within a storage associated with the extension computing device according to the extension command;
   retrieving the rasterized document image from the storage when instructed; and
   sending the rasterized document image to the MFP device without further processing,
   wherein the extension computing device is detachably connected to the MFP device.

15. The method of claim 14, further comprising determining that the print job is a PDL print job.

16. The method of claim 14, further comprising querying the extension computing device for a list including the rasterized document image.

17. The method of claim 16, further comprising selecting the rasterized document image from the list.

18. The extension computing device of claim 1, wherein the storage to store the document image is a local storage on the extension computing device, the extension computing device configured to retrieve the document image from the local storage upon request from the MFP device.

19. The method of claim 8, further comprising querying, using the extension engine, a page description language (PDL) capability of the MFP device and determining that the PDL capability is not supported by the MFP device.

* * * * *